(12) United States Patent
Manzoor

(10) Patent No.: US 10,208,831 B2
(45) Date of Patent: Feb. 19, 2019

(54) LOW FREQUENCY TORSIONAL VIBRATION DAMPER

(71) Applicant: Suhale Manzoor, Plymouth, MI (US)

(72) Inventor: Suhale Manzoor, Plymouth, MI (US)

(73) Assignee: DAYCO IP Holdings, LLC, Troy, MI (US)

(*) Notice: Subject to any disclaimer, the term of this patent is extended or adjusted under 35 U.S.C. 154(b) by 168 days.

(21) Appl. No.: 14/804,891

(22) Filed: Jul. 21, 2015

(65) Prior Publication Data

US 2016/0025184 A1 Jan. 28, 2016

Related U.S. Application Data

(60) Provisional application No. 62/029,098, filed on Jul. 25, 2014.

(51) Int. Cl.
*F16F 15/10* (2006.01)
*F16F 15/14* (2006.01)

(52) U.S. Cl.
CPC .......... *F16F 15/1442* (2013.01); *F16F 15/10* (2013.01)

(58) Field of Classification Search
CPC ........ F16F 15/10; F16F 15/12; F16F 15/1201; F16F 15/1202; F16F 15/1203; F16F 15/1217; F16F 15/1245; F16F 15/126; F16F 15/136; F16F 15/14; F16F 15/1414; F16F 15/1435; F16F 15/1442
See application file for complete search history.

(56) References Cited

U.S. PATENT DOCUMENTS

| 3,075,406 A | 1/1963 | Butler, Jr. et al. |
| 3,242,766 A | 3/1966 | Arnt |
| 3,477,311 A | 11/1969 | McGreary |
| 3,934,921 A * | 1/1976 | Nelken ............... B60B 17/0027 295/1 |
| 4,077,233 A | 3/1978 | Hörnig et al. |

(Continued)

FOREIGN PATENT DOCUMENTS

| DE | 1008063 B * | 5/1957 |
| DE | 2455385 A1 * | 5/1976 |

(Continued)

OTHER PUBLICATIONS

PCT, International Search Report and Written Opinion; PCT/US2015/041331 (dated Oct. 16, 2015).

(Continued)

*Primary Examiner* — Adam D Rogers
(74) *Attorney, Agent, or Firm* — FisherBroyles, LLP; Susan M. Oiler

(57) ABSTRACT

Torsional vibration dampers are disclosed that include a hub and an inertia member disposed concentric with and spaced radially outward or radially inward from the hub that together define a plurality of pockets therebetween each having a spool-shaped receptacle. A plurality of spool-shaped elastomeric plugs, one each, are seated in the spool-shaped receptacles. When the inertia member is spaced radially outward of the hub, the hub is mountable on a shaft, and when the inertia member is spaced radially inward of the hub, the hub is mountable inside a shaft. Methods of making the torsional vibration dampers are also disclosed.

19 Claims, 5 Drawing Sheets
(1 of 5 Drawing Sheet(s) Filed in Color)

(56) References Cited

U.S. PATENT DOCUMENTS

| | | | |
|---|---|---|---|
| 4,680,984 A | 7/1987 | Wahling et al. | |
| 5,562,544 A | 10/1996 | Ochs et al. | |
| 6,312,340 B1 * | 11/2001 | Gassen | F16F 15/1435 |
| | | | 180/902 |
| 6,837,345 B1 | 1/2005 | Lauble et al. | |
| 7,022,023 B2 | 4/2006 | Guo et al. | |
| 7,150,088 B2 * | 12/2006 | Kano | F16F 15/126 |
| | | | 29/428 |
| 7,658,127 B2 | 2/2010 | Crist | |
| 8,342,058 B2 * | 1/2013 | Christenson | F16F 7/108 |
| | | | 74/572.2 |
| 8,850,927 B2 * | 10/2014 | Kinoshita | F16F 15/145 |
| | | | 74/572.2 |
| 9,091,316 B2 * | 7/2015 | Paschen | F16F 7/108 |
| 9,322,453 B2 * | 4/2016 | Manzoor | F16F 15/1201 |
| 9,605,744 B2 * | 3/2017 | Mandel | F16H 55/36 |
| 2002/0139630 A1 | 10/2002 | Shih | |
| 2009/0078079 A1 | 3/2009 | Manzoor et al. | |
| 2012/0231909 A1 * | 9/2012 | Shin | F16F 15/126 |
| | | | 474/94 |
| 2016/0061286 A1 * | 3/2016 | Manzoor | F16F 15/30 |
| | | | 74/574.4 |
| 2016/0061287 A1 * | 3/2016 | Manzoor | F16F 15/30 |
| | | | 74/574.4 |
| 2017/0059028 A1 * | 3/2017 | Manzoor | F16H 1/00 |
| 2017/0082177 A1 * | 3/2017 | Manzoor | F16H 7/20 |
| 2017/0175851 A1 * | 6/2017 | Horita | F16F 15/145 |

FOREIGN PATENT DOCUMENTS

| | | | | |
|---|---|---|---|---|
| DE | 3902768 A1 | * | 8/1990 | F16F 15/1435 |
| DE | 19630780 A1 | * | 2/1998 | F16D 3/78 |
| DE | 102016219670 A1 | * | 5/2017 | F16F 15/14 |
| GB | 1307607 A | * | 2/1973 | |
| JP | 08093854 A | * | 4/1996 | |
| JP | 2013185598 A | * | 9/2013 | |
| WO | WO 2013163156 A1 | * | 10/2013 | B22F 3/12 |

OTHER PUBLICATIONS

EP, Supplemental Search Report; European Application No. 15824367.5 (dated Mar. 12, 2018).

* cited by examiner

LOW FREQUENCY TORSIONAL VIBRATION DAMPER

RELATED APPLICATION

This application claims the benefit of U.S. Provisional Application 62/029,098, filed Jul. 25, 2014, which is incorporated herein by reference in its entirety.

TECHNICAL FIELD

The present invention relates to torsional vibration dampers for vehicle engines, in particular to attenuate the torsional vibrations inherent to the driveline, and, more particularly, to torsional vibration dampers having a hub and inertia member retained together by a plurality of elastomeric plugs, which eliminates molding, bonding, or adhering the components together.

BACKGROUND

Low frequency torsional vibration dampers are usually of the mold bonded variety. Mold bonding is the process by which the elastomeric material is bonded to the metals in a molding process. Mold bonding includes cleaning the metallic surfaces through shot or sand blasting, applying a primer to the cleaned metallic surfaces, applying an adhesive to the primed surfaces, placing the metals in an injection mold, and injecting the elastomeric material. This process causes a significant increase in the cost of the damper. Thus, dampers that do not require such a process are needed.

SUMMARY

Disclosed herein are torsional vibration dampers having a hub and inertia member retained together by a plurality of elastomeric plugs. These torsional vibration dampers are cheaper and easier to manufacture and assembly. In one embodiment, the hub and the inertia member are disposed concentric relative to one another with the inertia member either spaced radially outward or radially inward from the hub and, together, define a plurality of pockets therebetween each having a spool-shaped receptacle. A plurality of spool-shaped elastomeric plugs, one each, are seated in the spool-shaped receptacles. Each pocket orients the spool-shaped elastomeric plug therein with its central longitudinal axis parallel to an axis of rotation of the torsional vibration damper. There may be three or more pockets formed between the hub and the inertia member, and they may be equidistant apart.

In one embodiment, the inertia member is spaced radially outward of the hub, and the hub is mountable on a shaft. In another embodiment, the inertia member is spaced radially inward of the hub, and the hub is mountable inside a shaft.

The spool-shaped receptacles each include a central rib portion, on both the hub and the inertia member, and the central rib portion is seated against a core of the spool-shaped elastomeric plugs. The spool-shaped elastomeric plugs include a first flange and a second flange relative to the core. The first flange and the second flange each have an outer diameter that is smaller than an inner diameter of the spool-shaped receptacle, thereby defining a clearance gap between the first and second flanges and the spool-shaped receptacle. However, at least the core of the spool-shaped elastomeric plugs is compressed between the hub and the inertia member after assembly.

In another aspect, methods for manufacturing the torsional vibration dampers are disclosed. In one embodiment, the method includes molding the hub and inertia members described above and then mating the two together with a plurality of spool-shaped elastomeric members, one each, in the plurality of pockets. In another embodiment, the method includes providing a hub having a plurality of protrusions and machining into each protrusion a portion of a partial-pipe, spool-shaped receptacle and providing an inertia member and machining into an appropriate surface thereof a plurality of spaced apart partial-pipe, spool-shaped receptacles as well, and then, mating the two together with a plurality of spool-shaped elastomeric members, one each, in the plurality of pockets.

BRIEF DESCRIPTION OF DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
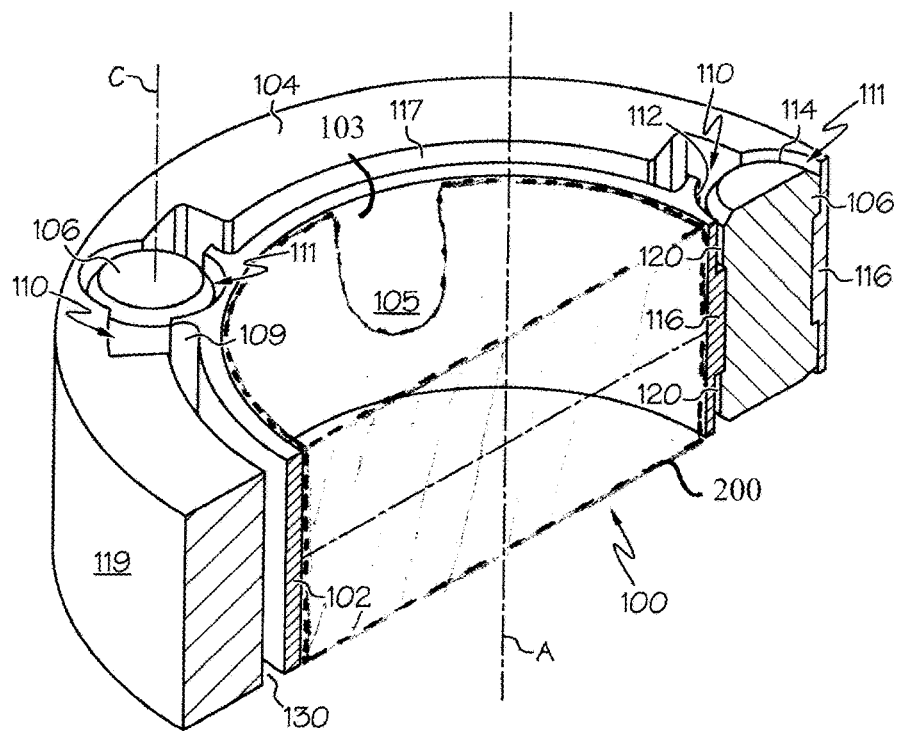
FIG. 1 is a longitudinal cross-section view of a torsional vibration damper having a hub and inertia member retained together by a plurality of elastomeric plugs.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
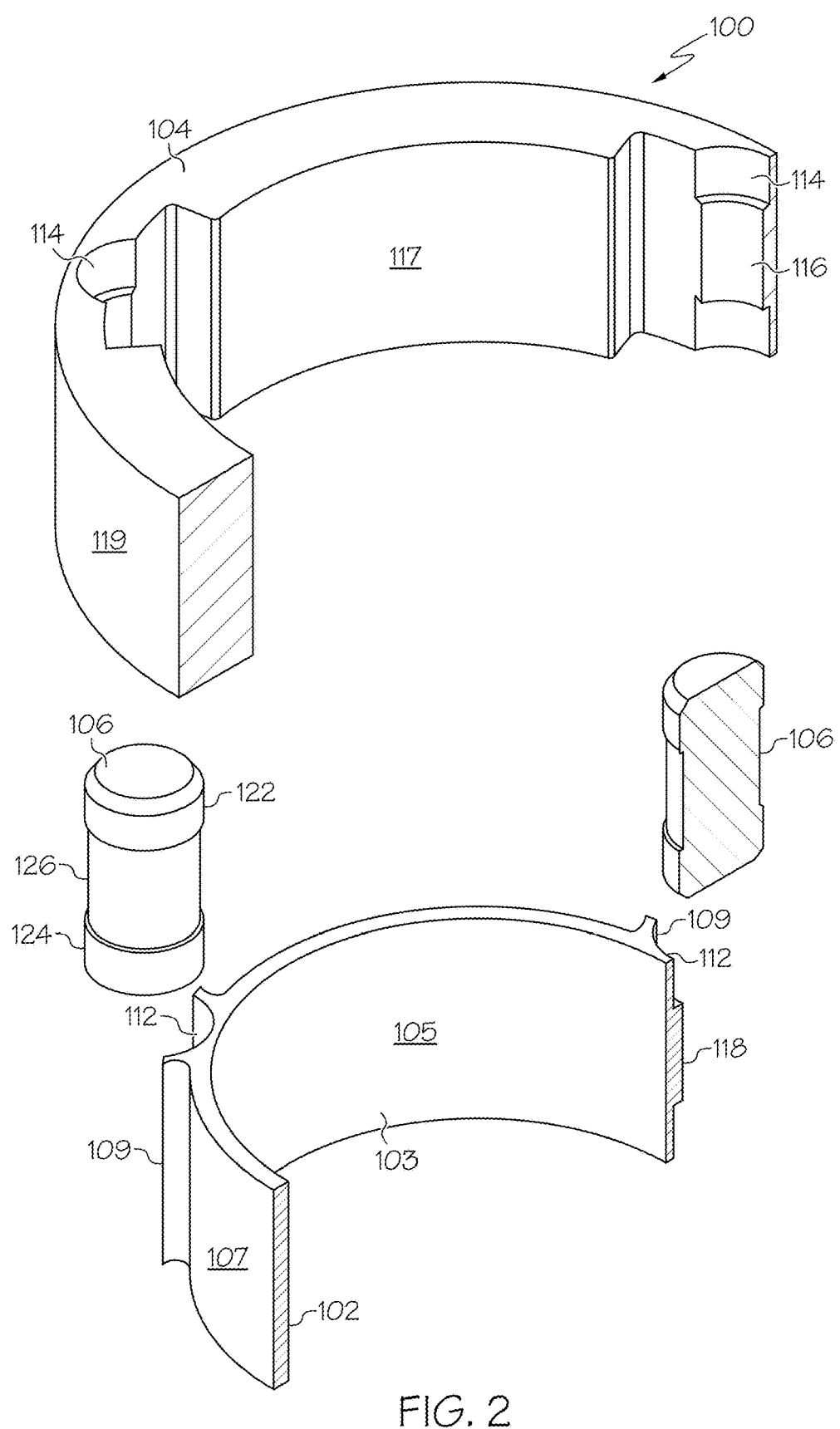
FIG. 2 is an exploded, perspective view of the torsional vibration damper of FIG. 1.
Figure 3:
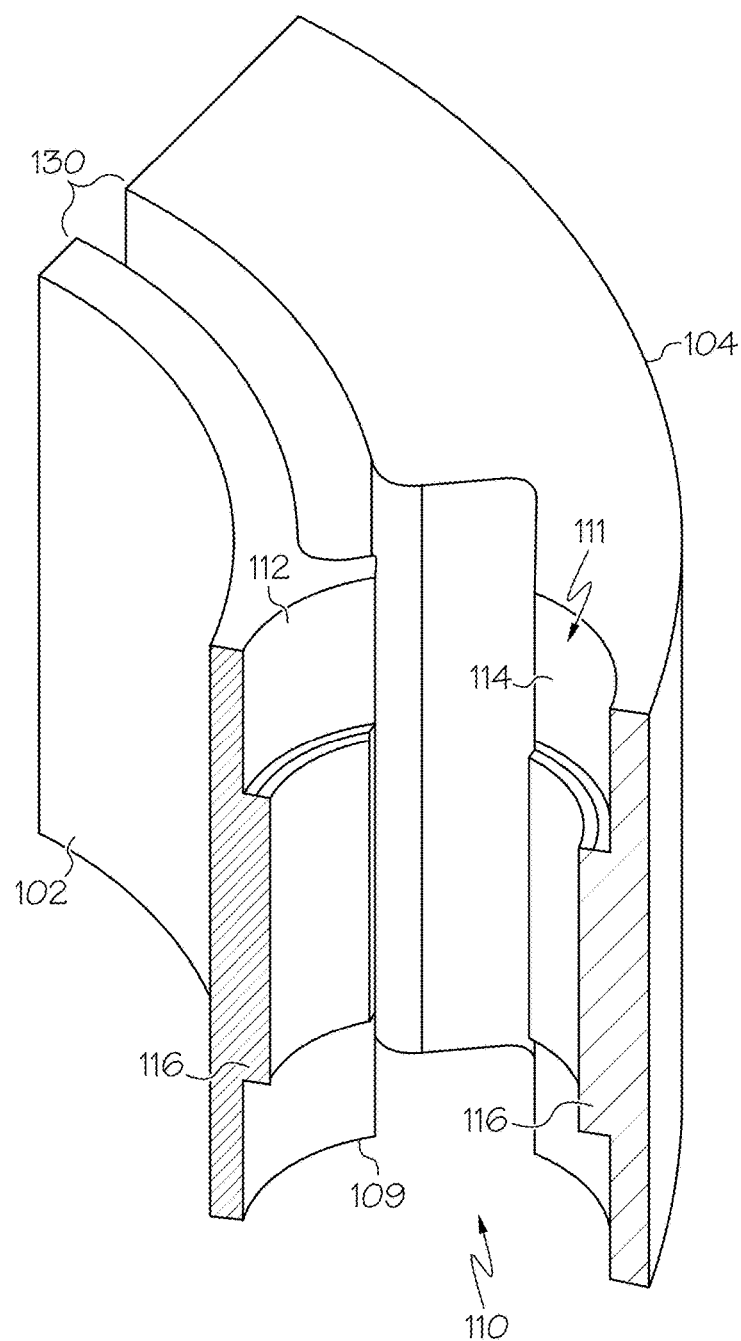
FIG. 3 is an enlarged view through one of the pockets defined by the hub and inertia ring.
Figure 4:
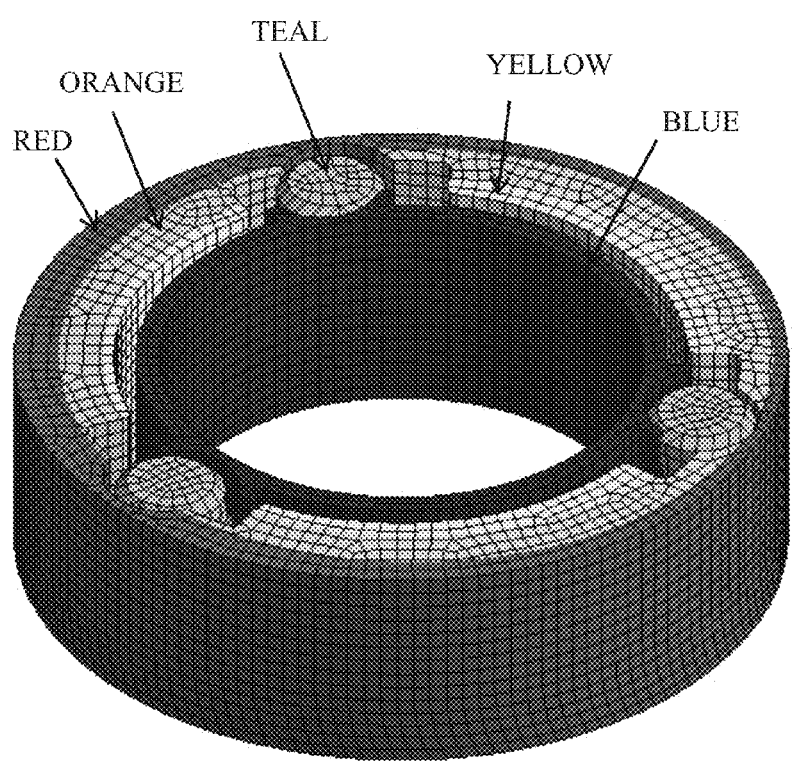
FIG. 4 is a modal plot that is normalized such that the color bands show the deformation magnitude and the mode shape.

A torsional vibration damper, generally designated by reference 100 in FIGS. 2-4, is described that includes a hub 102 mountable on a shaft 200 and an inertia member 104 disposed concentric with and spaced radially outward from the hub. The hub 102 and the inertia member 104, together, define a plurality of pockets 110 therebetween that each have an elastomeric plug 106 seated therein, which holds the hub 102 and inertia member 104 together with respect to one another. The hub 102 is mountable on a shaft 200 to attenuate torsional vibrations by receiving the shaft through a central bore 103 of the hub 102. With the elastomeric plugs 106 seated in the pockets 110, the hub 102 and inertia member 104 are spaced apart from one another radially, thereby defining clearance gaps 130 therebetween that are generally arcuate and extend from one pocket 110 to a neighboring pocket 110 thereof.

Figure 5:
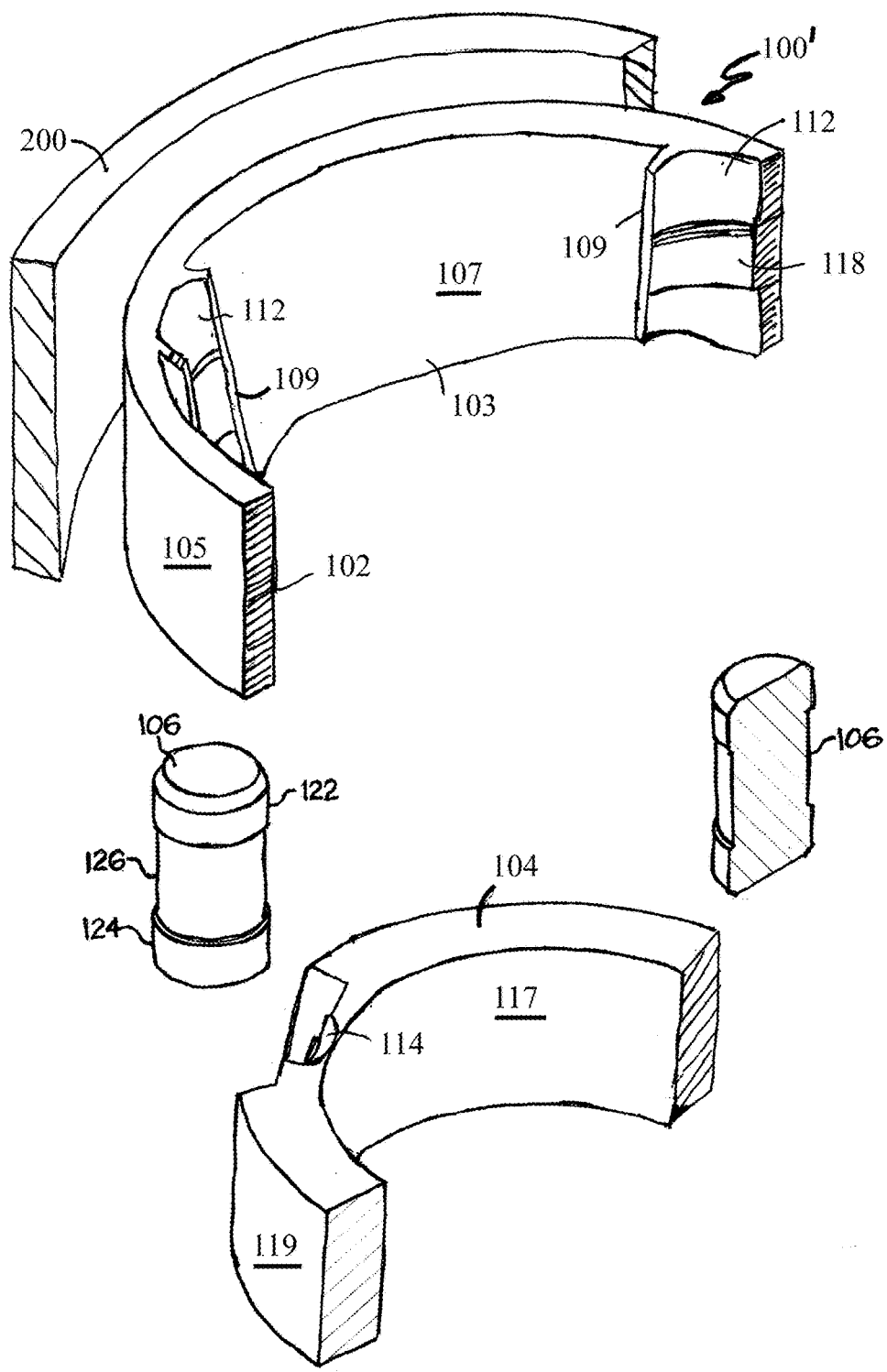
FIG. 5 is a longitudinal cross-section view of a second embodiment of a torsional vibration damper.

In another embodiment, the reverse configuration, designated as 100', is also useful in which the inertia member is disposed concentric with and spaced radially inward from the hub as shown in FIG. 5. In this embodiment, the hub 102 is mountable inside a shaft 200 rather than on a shaft. The hub 102 and the inertia member 104, together, still define a plurality of pockets therebetween that each have an elastomeric plug 106 seated therein, which holds the hub 102 and inertia member 104 together with respect to one another. The torsional vibration damper 100' attenuates torsional vibrations by being seated against the inner surface of the shaft, i.e., in a bore within the shaft. With the elastomeric plugs 106 seated in the pockets, the hub 102 and inertia member 104 are spaced apart from one another radially, thereby defining clearance gaps therebetween that are generally arcuate and extend from one pocket to a neighboring pocket thereof. The description of the plugs and the pockets set forth below is applicable to this embodiment as well as the one shown in FIGS. 1-3.

As labeled in FIG. 2, the elastomeric plugs 106 are spool-shaped elastomeric members having a first flange 122 and a second flange 124 separated by a core section 126. The first flange 122 and the second flange 124 have outer diameters that are larger than the outer diameter of the core section 126, but their outer diameters are smaller than an inner diameter of the spool-shaped receptacle 111 within which it is seated. This construction defines a clearance gap 120, depicted in the assembled view of FIG. 1, between the first and second flanges 122, 124 and the spool-shaped receptacle 111, which contributes to the torsional vibration damper being a low frequency torsional vibration damper.

Each pocket 110 includes a spool-shaped receptacle 111 formed by a first partial-pipe, spool-shaped receptacle 112 of the hub 102 and a second partial-pipe, spool-shaped receptacle 114 of the inertia member 104. Each of the first and second partial-pipe, spool-shaped receptacles 112, 114 include a central rib 116 protruding into the pocket 110 and seated against the core section 126 of a spool-shaped elastomeric member 106. Each spool-shaped receptacle 111 orients each of the spool-shaped elastomeric members 106 axially with its central longitudinal axis C parallel to an axis of rotation of the torsional vibration damper A, which are labeled in FIG. 1.

Referring primarily to FIGS. 1 and 2, the hub 102 has an inner diameter defined by an inner annular surface 105 and has an outer annular surface 107. The outer annular surface 107 includes a plurality of spaced apart protrusions 109 extending across the width thereof (like a cog, but not for transferring motion). Each protrusion 109 includes a first partial-pipe, spool-shaped receptacle 112 recessed therein. The first partial-pipe, spool-shaped receptacle 112 includes a central rib 116 protruding into the pocket 110 for engagement with a spool-shaped elastomeric member 106. The hub 102 may be cast, spun, forged, machined, or molded using known or hereinafter developed techniques. Suitable material for the hub includes iron, steel, aluminum, other suitable metals, plastics, or a combination thereof, including composite materials. Accordingly, the protrusions 109 and the first partial-pipe, spool-shaped receptacle 112 may be machined into the hub 102 after the hub's formation or cast or molded into the hub during the hub's formation.

Referring primarily to FIGS. 1 and 2, the inertia member 104 has an inner diameter defined by an inner annular surface 117 and has an outer annular surface 119. The inner annular surface 117 includes a second partial-pipe, spool-shaped receptacle 114 recessed therein. The second partial-pipe, spool-shaped receptacle 114 includes a central rib 116 protruding into the pocket 110 for engagement with a spool-shaped elastomeric member 106. The inertia member 104 may be made from any material having a sufficient inertia, usually cast iron, steel, or similar dense material and may be cast, spun, forged, machined, or molded using known or hereinafter developed techniques. Accordingly, the second partial-pipe, spool-shaped receptacle 114 may be machined into the inertia member 104 after the inertia member's formation or cast or molded into the inertia member 104 during the inertia member's formation.

In the embodiment depicted in the drawings, the torsional vibration damper 100 includes three pockets spaced generally equidistant apart from each neighboring pocket, hence about 120 degrees apart. In other embodiments, four pockets, five pockets, or six pockets may be present, but are not limited thereto, which may be generally equidistant apart. While an equidistant embodiment is illustrated in the figures, it can be appreciated that the construction is not limited thereto, and in one embodiment, the pockets may be offset or irregularly spaced apart.

The spool-shaped elastomeric members 106 are each disposed in contact with a first partial-pipe, spool-shaped receptacle 112 of the hub 102 aligned with a second partial-pipe, spool-shaped receptacle 114 of the inertia member 104, thereby operably coupling the inertia member 104 to the hub 102 for rotation therewith. The spool-shaped elastomeric members 106 may be press fit into a spool-shaped receptacle 111 so as to non-rigidly couple the hub 102 and the inertia member 104. Accordingly, the spool-shaped elastomeric members are each compressed between the hub 102 and the inertia member 104. In one embodiment, each of the spool-shaped elastomeric members 106 may be compressed, as in FIG. 1, about 1% to about 20% relative to their uncompressed, unassembled state shown in FIG. 2.

The spool-shaped elastomeric members 106 may be any suitable elastomer to absorb and/or dampen the torsional vibrations generated by a rotating shaft upon which the torsional vibration damper 100 is mounted. The elastomer is preferably one suitable for automotive engine applications, i.e., suitable to withstand temperatures experienced in the engine and road temperatures and conditions. The spool-shaped elastomeric members 106 may, however, be as disclosed in U.S. Pat. No. 7,658,127, which is incorporated herein, in its entirety, by reference. In one embodiment, the elastomeric members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber. In one embodiment, the elastomeric damper member 140 may be attached to the outermost radial surface 106 using a conventional adhesive known for use in vibration damping systems. Some examples of suitable adhesives include rubber bonding adhesives sold by the Lord Corporation, Henkel AG & Co., or Morton International Incorporated Adhesives & Specialty Company.

FIG. 4 shows a normalized modal plot where the red color shows maximum deflection and the blue color shows minimum deflection inversely varying along the colors of a rainbow (Blue, Teal, Yellow, Orange, and Red). The concentric coloring scheme denotes the torsional mode of vibration at the natural frequency of the structure.

As mentioned above, the portions of the pockets 110 in the hub 102 and the inertia member 104 may be formed therein by molding, casting, forging, spinning or machining. In one embodiment, the method of making the torsional vibration damper 100 includes molding a hub that has a plurality of spaced apart protrusions on the outermost surface thereof that each include a first partial-pipe, spool-shaped receptacle recessed therein and molding an inertia member, having an inner diameter that is larger than the hub, to include a plurality of spaced apart second partial-pipe, spool-shaped receptacles recessed into the surface defining the inner diameter thereof. Then, the hub is inserted into the inertia member with each first partial-pipe, spool-shaped receptacle aligned with one of the second partial-pipe, spool-shaped receptacles thereby defining a plurality of pockets, and a plurality of spool-shaped elastomeric members, one each, is inserted in the plurality of pockets.

In another embodiment, the hub and inertia member may be provided and the first and second partial-pipe, spool-shaped receptacles, respectively, are machined therein. The hub and inertia member may have been initially formed by any of the methods discussed above, or any other method known to one of skill in the art. Thereafter, the hub is inserted into the inertia member with each first partial-pipe, spool-shaped receptacle aligned with one of the second partial-pipe, spool-shaped receptacles thereby defining a plurality of pockets, and a plurality of spool-shaped elastomeric members, one each, is inserted in the plurality of pockets.

The torsional vibration damper disclosed herein eliminates mold-bonding of the elastomeric member to the other components of the damper, which reduces the cost of manufacturing.

Although the invention is shown and described with respect to certain embodiments, it is obvious that modifications will occur to those skilled in the art upon reading and understanding the specification, and the present invention includes all such modifications.

What is claimed is:

1. A torsional vibration damper comprising:
   a hub;
   an inertia member disposed concentric with and spaced radially outward or radially inward from the hub;
   wherein the hub and inertia member define a plurality of pockets therebetween; and
   a plurality of elastomeric plugs, one each seated in each of the plurality of pockets;
   wherein each of the plurality of elastomeric plugs has a first flange and a second flange at opposing axial ends separated by a core section, in an uncompressed, unassembled stated;
   wherein when the inertia member is spaced radially outward of the hub, the hub is mountable on a shaft, and when the inertia member is spaced radially inward of the hub, the hub is mountable inside a shaft.

2. The torsional vibration damper of claim 1, wherein each of the plurality of elastomeric plugs has a central longitudinal axis and each pocket orients one of the plurality of elastomeric plugs therein with the central longitudinal axis parallel to an axis of rotation of the torsional vibration damper.

3. The torsional vibration damper of claim 1, wherein each of the plurality of pockets includes a central rib portion on both the hub and the inertia member seated against the core section of one of the plurality of elastomeric plugs.

4. The torsional vibration damper of claim 3, wherein the first flange and the second flange of each of the plurality of elastomeric plugs has an outer diameter that is smaller than a first inner diameter of a portion of one of the plurality of pockets receiving the first flange and a second inner diameter of a portion of one of the plurality of pockets receiving the second flange thereby defining a clearance gap between the first and second flanges and the one of the plurality of pockets.

5. The torsional vibration damper of claim 1, wherein each of the plurality of elastomeric plugs are compressed in a radial direction between the hub and the inertia member.

6. The torsional vibration damper of claim 5, wherein each of the plurality of elastomeric plugs comprise a rubber material.

7. The torsional vibration damper of claim 1, wherein the plurality of pockets are spaced apart equally distant from adjacent neighboring pockets.

8. The torsional vibration damper of claim 7, wherein the plurality of pockets is three pockets.

9. A method of making a torsional vibration damper, the method comprising:
   providing a hub that includes a plurality of protrusions on either an outermost surface thereof or an innermost surface thereof, the plurality of protrusions being spaced apart from one another;
   providing an inertia member sized to fit adjacent to either the outermost surface or the innermost surface of the hub having the plurality of protrusions;
   machining into each of the plurality of protrusions of the hub a first pocket portion comprising a first partial-pipe shaped receptacle;
   machining into a surface of the inertia member that is adjacent to either the outermost surface or the innermost surface of the hub having the plurality of protrusions, a plurality of second pocket portions spaced apart from one another that each comprise a second partial-pipe shaped receptacle;
   mating the hub and the inertia member with each first pocket portion aligned with one of the second pocket portions thereby defining a plurality of pockets; and
   positioning a plurality of elastomeric members, one each, in the plurality of pockets;
   wherein each of the plurality of elastomeric members has a first flange and a second flange at opposing axial ends separated by a core section.

10. The method of claim 9, wherein each of the plurality of elastomeric members has a central longitudinal axis and each pocket orients one of the plurality of elastomeric members therein with the central longitudinal axis parallel to an axis of rotation of the torsional vibration damper.

11. The method of claim 9, wherein each of the first partial-pipe shaped receptacles and the second partial-pipe shaped receptacles include a central rib portion seated against the core section of one of the plurality of elastomeric members which is seated therein.

12. The method of claim 11, wherein the first flange and the second flange of each of the plurality of elastomeric members has an outer diameter that is smaller than an inner diameter formed by the first and second partial-pipe shaped receptacles thereby defining a clearance gap therebetween.

13. A method of making a torsional vibration damper, the method comprising:
   molding a hub having a plurality of spaced apart protrusions on either an outermost surface thereof or an innermost surface thereof, wherein each protrusion includes a first partial-pipe shaped receptacle recessed therein;

molding an inertia member sized to fit adjacent to either the outermost surface or the innermost surface of the hub having the plurality of protrusions, wherein the inertia member includes a plurality of spaced apart second partial-pipe shaped receptacles recessed into a surface thereof that is adjacent to either the innermost surface or the outermost surface of the hub having the plurality of protrusions;

mating the hub and the inertia member with each first partial-pipe shaped receptacle aligned with one of the second partial-pipe shaped receptacles thereby defining a plurality of pockets; and positioning a plurality of elastomeric members, one each, in the plurality of pockets;

wherein each of the plurality of elastomeric members has a first flange and a second flange at opposing axial ends separated by a core section.

14. The method of claim 13, wherein each of the plurality of elastomeric plugs has a central longitudinal axis and each pocket orients one of the plurality of elastomeric members therein with the central longitudinal axis parallel to an axis of rotation of the torsional vibration damper.

15. The method of claim 13, wherein each of the first partial-pipe shaped receptacles and the second partial-pipe shaped receptacles include a central rib portion seated against the core section of one of the plurality of elastomeric members which is seated therein.

16. The method of claim 15, wherein the first flange and the second flange of each of the plurality of elastomeric members has an outer diameter that is smaller than an inner diameter formed by the first and second partial-pipe shaped receptacles thereby defining a clearance gap therebetween.

17. A torsional vibration damper comprising:
a hub;
an inertia member disposed concentric with and spaced radially outward or radially inward from the hub;
wherein the hub and inertia member define a plurality of pockets therebetween; and
a plurality of elastomeric plugs, each having a first flange and a second flange at opposing axial ends separated by a core section, one each seated in each of the plurality of pockets;
wherein each of the plurality of pockets includes a central rib portion on both the hub and the inertia member seated against the core section of one of the plurality of elastomeric plugs, thereby operative coupling the hub and the inertia member for rotation together.

18. The torsional vibration damper of claim 17, wherein the first flange and the second flange of each of the plurality of elastomeric plugs has an outer diameter that is smaller than a first inner diameter of a portion of one of the plurality of pockets receiving the first flange and a second inner diameter of a portion of one of the plurality of pockets receiving the second flange thereby defining a clearance gap between the first and second flanges and the one of the plurality of pockets.

19. The torsional vibration damper of claim 17, wherein each of the plurality of elastomeric plugs are compressed in a radial direction between the hub and the inertia member.

* * * * *